United States Patent [19]

Laas et al.

[11] Patent Number: 5,252,696

[45] Date of Patent: Oct. 12, 1993

[54] WATER-DISPERSIBLE POLYISOCYANATE MIXTURES, A PROCESS FOR THEIR PREPARATION AND THEIR USE IN TWO-COMPONENT AQUEOUS COMPOSITIONS

[75] Inventors: Hans J. Laas; Tillmann Hassel, both of Cologne; Werner Kubitza, Leverkusen; Reinhard Halpaap, Odenthal-Gleobusch; Klaus Noll, Cologne, all of Fed. Rep. of Germany

[73] Assignee: Bayer Aktiengesellschaft, Leverkusen, Fed. Rep. of Germany

[21] Appl. No.: 971,491

[22] Filed: Nov. 4, 1992

[30] Foreign Application Priority Data

Nov. 7, 1991 [DE] Fed. Rep. of Germany ....... 4136618

[51] Int. Cl.$^5$ .............................................. C08G 18/30
[52] U.S. Cl. ...................................... 528/49; 528/76; 528/77
[58] Field of Search ...................... 528/49, 76, 77

[56] References Cited

U.S. PATENT DOCUMENTS

| | | | |
|---|---|---|---|
| 3,996,154 | 12/1976 | Johnson et al. | 252/312 |
| 4,186,118 | 1/1980 | Reischl et al. | 260/29.2 TN |
| 4,413,112 | 11/1983 | Reiff et al. | 528/73 |
| 4,433,095 | 2/1984 | Hombach et al. | 524/563 |
| 4,472,550 | 9/1984 | Reiff et al. | 524/589 |
| 4,528,117 | 7/1985 | Scholl et al. | 252/312 |
| 4,576,771 | 3/1986 | Scholl et al. | 264/109 |
| 4,663,377 | 5/1987 | Hombach et al. | 524/196 |
| 4,711,918 | 12/1987 | Kubitza et al. | 524/196 |
| 5,075,370 | 12/1991 | Kubitza et al. | 524/591 |
| 5,200,489 | 4/1993 | Jacobs et al. | 528/49 |

FOREIGN PATENT DOCUMENTS

| | | |
|---|---|---|
| 1195048 | 5/1983 | Canada . |
| 1417276 | 12/1975 | United Kingdom . |
| 1417618 | 12/1975 | United Kingdom . |
| 1444933 | 8/1976 | United Kingdom . |
| 1502777 | 3/1978 | United Kingdom . |
| 1523601 | 9/1978 | United Kingdom . |
| 2018796 | 10/1979 | United Kingdom . |
| 2075038 | 11/1981 | United Kingdom . |

*Primary Examiner*—Maurice J. Welsh
*Attorney, Agent, or Firm*—Joseph C. Gil; Thomas W. Roy

[57] ABSTRACT

The present invention relates to water-dispersible polyisocyanate mixtures which a) have an average isocyanate functionality of 1.8 to 4.2,
b) contain 12.0 to 21.5% by weight of (cyclo)aliphatically bound isocyanate groups (calculated as NCO, molecular weight=42) and
c) contain 2 to 20% by weight of ethylene oxide units (calculated as $C_2H_4O$, molecular weight=44) arranged within polyether chains, the polyether chains containing an average of 5.0 to 9.9 ethylene oxide units.

The present invention also relates to the preparation of these polyisocyanate mixtures by reacting at an NCO-/OH equivalent ratio of 4:1 to 120:1

A) a polyisocyanate component having an average isocyanate functionality of 2.1 to 4.4 and containing one or more polyisocyanates in which all the isocyanate groups are (cyclo)aliphatically bound with
B) a monovalent polyalkylene oxide polyether alcohol containing an average of 5.0 to 9.9 ethylene oxide units.

Finally, the present invention also relates to aqueous two-component compositions containing these polyisocyanate mixtures and aqueous resins having isocyanate-reactive groups.

5 Claims, No Drawings

WATER-DISPERSIBLE POLYISOCYANATE MIXTURES, A PROCESS FOR THEIR PREPARATION AND THEIR USE IN TWO-COMPONENT AQUEOUS COMPOSITIONS

BACKGROUND OF THE INVENTION

1. Field of the Invention

This invention relates to non-ionic, hydrophilically-modified, water-dispersible polyisocyanate mixtures containing (cyclo)aliphatically bound isocyanate groups, to a process for their preparation and to their use as cross-linking agents in two-component aqueous compositions.

2. Description of the Prior Art

There has been a great increase in recent years in the importance of aqueous lacquers and coatings due to the increasingly stricter guidelines concerning emission of the solvents released during the application of coatings.

Although aqueous coating compositions have become available for many fields of application, in many cases they can only achieve the high quality of conventional solvent-containing coating compositions with regard to the resistance to solvents and chemicals and mechanical load bearing capacity if a chemical cross-linking reaction is carried out during formation of the films.

Attempts to carry out the cross-linking of aqueous lacquers with compounds containing free isocyanate groups (i.e., to apply the concept of polyurethane reactive lacquers commonly used in the field of solvent-containing coatings to aqueous systems) have only rarely been carried out.

DE-OS 2,708,442 describes the addition of monomeric organic diisocyanates for improving the properties of aqueous polyurethane dispersions. According to DE-OS 3,529,249, organic polyisocyanates may be used for increasing the resistance to solvents and chemicals and improving the wearing properties of coatings based on water-dispersible homo- and copolymers. The described positive effects on the properties of the coating compositions may be attributed to a formation of a "urea shell" around the dispersed polymer particles resulting from the reaction of the isocyanates with water. The polyisocyanates used as additives thus do not function as cross-linking agents for synthetic resins or synthetic resin precursors containing isocyanate reactive groups which are dispersed in water.

The preparation of an aqueous polyurethane reactive system from selected aqueous polyhydroxyl compounds which have an emulsifying action and low viscosity free polyisocyanates is described in DE-OS 3,829,587. This process results in coatings whose properties are equal to those of typical solvent-based two-component coating compositions.

Since organic polyisocyanates are generally difficult to emulsify in water, the process of DE-OS 3,829,587 is limited to specific polyol dispersions which have an emulsifying action. The application of this process to any aqueous binders containing isocyanate reactive groups would require the use of hydrophilically modified, self-emulsifiable polyisocyanate components.

British Patent Specifications 1,417,618 and 1,417,276 describe reaction products of organic polyisocyanates, in particular aromatic polyisocyanates, with i) polyethylene glycol monoalkyl ethers having at least 5, but in the examples always more than 10, ethylene oxide units or ii) diesters of malonic acid and polyethers of this type as surface-active substances. According to GB-PS 1,444,933 and DE-OS 2,908,844 stable aqueous emulsions of aromatic polyisocyanates are prepared.

Aqueous isocyanate emulsions obtained using emulsifiers such as those prepared by the reaction of di- or polyisocyanates with special monofunctional polyethylene oxide polyethers having at least 10 ethylene oxide units are described in DE-OS 2,921,681.

Aromatic polyisocyanates which are hydrophilically modified with alkylene oxide polyethers are described in EP-A-61,628 and EP-A-95,594.

In the form of aqueous emulsions, such products are preferably used as adhesives or binders, for example, for gluing chipboard, for the production of moulded articles or for gluing polyurethane foams (DE-OS 2,447,135, 2,610,552 and 2,921,726 and GB 1,502,777, 2,075,038 and EP-A-0310-345).

Aromatic polyisocyanates are, however, limited in their usefulness as cross-linking components for aqueous coating compositions systems due to their high reactivity with water and the consequent evolution of carbon dioxide and the well known lack of resistance to yellowing of coatings obtained from aromatic polyisocyanates.

Isocyanate functional cross-linking agents for high quality, light-fast, aqueous coating compositions can only be obtained from less reactive (cyclo)aliphatic polyisocyanates.

Water dispersible compositions containing such (cyclo)aliphatic polyisocyanates are disclosed in EP-A-206,059 and contain, as emulsifiers, reaction products of polyisocyanates with monohydric or polyhydric polyalkylene oxide alcohols consisting of at least one polyether chain having at least 10 ethylene oxide units. However, only polyether alcohols having more than 15 ethylene oxide units per molecule have been used in the Examples. The water-dispersible compositions disclosed in the prior publication are used as additives for aqueous adhesives.

The polyisocyanate compositions described in this prior publication are, however, not very suitable as crosslinking agents for aqueous solutions or dispersions of binders or binder components containing isocyanate reactive groups, in particular alcoholic hydroxyl groups.

In two-component coating compositions, a basic requirement for good lacquer technical properties is a very homogeneous distribution of the cross-linking component in the binder. In aqueous polyurethane reactive systems, this requires the use of polyisocyanates which have been rendered highly hydrophilic and can be emulsified in exceptionally fine form. The water-dispersible polyisocyanate preparations described in EPA 206 059 frequently tend to crystallize when stored at room temperature if they contain the relatively large quantities of emulsifier required for obtaining good emulsification.

Emulsification in water of polyisocyanates which have been rendered hydrophilic is generally associated with considerable changes in viscosity. The viscosity of the water-in-oil emulsion originally formed progressively increases with increasing absorption of water until finally phase reversal results in the formation of an oil-in-water emulsion and a decrease in viscosity. The viscosity maximum which is required to be overcome is so high, in particular for the emulsification of the polyisocyanate compositions EP-A-206,059 which have a high emulsifier content, that in many cases these compositions can only be stirred into water and distributed sufficiently finely if high shearing forces are employed (e.g., high speed stirrers) or considerable quantities of organic co-solvents are added. The presence of organic co-solvents in aqueous coating compositions should be avoided to the extent possible for ecological reasons and the use of high speed stirrers in most cases causes troublesome foaming of the coating compositions.

Accordingly, it is an object of the present invention to provide hydrophilically modified polyisocyanate mixtures containing (cyclo)aliphatically bound isocyanate groups which do not have the above-described disadvantages of the known water-dispersible polyisocyanates. It is an additional object of the present to prepare these hydrophilically modified polyisocyanate mixtures from known polyisocyanates which are suitable as starting components for the production of polyurethane resins, preferably as cross-linking agents for aqueous binders or binder components in aqueous coating compositions. These polyisocyanates include in particular those based on derivatives of 1,6-diisocyanatohexane (HDI) or 1-isocyanato-3,3,5-trimethyl-5-isocyanatomethyl-cyclohexane (IPDI) which contain uretdione, isocyanurate, urethane, allophanate, bioret and/or oxadiazine groups.

These objects may be achieved with the polyisocyanate mixtures according to the present invention which are described hereinafter and the process for their preparation. The present invention is based on the surprising discovery that (cyclo)aliphatic polyisocyanates which have been hydrophilically modified by a reaction with monofunctional polyether alcohols containing a statistical average of less than 10 ethylene oxide units can very easily be emulsified in water without troublesome fluctuations in viscosity.

In accordance with the process according to the invention highly hydrophilic polyisocyanate mixtures can be obtained in very finely emulsified form. In contrast to the known water-dispersible polyisocyanate compositions, those according to the invention show no tendency to crystallize even when they have the same ethylene oxide unit content.

Even though
1) polyethylene oxide polyethers having a minimum chain length of 5 ethylene oxide units are disclosed in some of the previously discussed publications, for example, in GB 1,444,933 and DE-OS 2,447,135, 2,908,844 and 2,921,726, as suitable for the preparation of emulsifiers,
2) monomeric (cyclo)aliphatic diisocyanates such as HDI and IPDI are included in long lists of suitable polyisocyanates and
3) DE-OS 2,921,726 also discloses modified polyisocyanates, for example, polyisocyanates modified with isocyanurate or biuret groups, it would not be possible for a skilled artisan to predict based on these publications that (cyclo)aliphatic polyisocyanates, in particular modified polyisocyanates, could very easily be stirred into water to form stable, finely divided emulsions after they have been reacted with polyether alcohols containing less than 10 ethylene oxide units, and that this could be achieved without the necessity of overcoming a noticeable viscosity maximum. These findings are surprising since according to the teachings of EPA 206,059 it was to be expected that aqueous emulsions of such polyisocyanates could only be prepared with the aid of emulsifiers containing at least 10 ethylene oxide units, and according to the Examples, such polyisocyanates could only be obtained with the aid of emulsifiers having at least 15 ethylene oxide units.

SUMMARY OF THE INVENTION

The present invention relates to water-dispersible polyisocyanate mixtures which a) have an average isocyanate functionality of 1.8 to 4.2,
b) contain 12.0 to 21.5% by weight of (cyclo)aliphatically bound isocyanate groups (calculated as NCO, molecular weight=42) and
c) contain 2 to 20% by weight of ethylene oxide units (calculated as $C_2H_4O$ molecular weight=44) arranged within polyether chains, the polyether chains containing an average of 5.0 to 9.9 ethylene oxide units.

The present invention also relates to the preparation of these polyisocyanate mixtures by reacting at an NCO/OH equivalent ratio of 4:1 to 120:1

A) a polyisocyanate component having an average isocyanate functionality of 2.1 to 4.4 and containing one or more polyisocyanates in which all the isocyanate groups are (cyclo)aliphatically bound with
B) a monovalent polyalkylene oxide polyether alcohol containing an average of 5.0 to 9.9 ethylene oxide units.

Finally, the present invention also relates to aqueous two-component compositions containing these polyisocyanate mixtures and aqueous resins having isocyanate-reactive groups.

DETAILED DESCRIPTION OF THE INVENTION

Component A) to be used in the process according to the invention has an (average) isocyanate functionality of 2.1 to 4.4, preferably 2.3 to 4.2. It contains one or more organic polyisocyanates in which all of the isocyanate groups are (cyclo)aliphatically bound. The polyisocyanates or polyisocyanate mixtures of component A) may contain any polyisocyanates having uretdione, isocyanurate, urethane, allophanate, bioret and/or oxadiazine groups prepared by the modification of monomeric (cyclo)aliphatic diisocyanates as described, for example, in DE-OS 1,670,666, 3,700,209 and 3,900,053 or in EP-A 336,205 and EP-A 339,396.

Diisocyanates suitable for the preparation of these modified polyisocyanates are those having a molecular weight of 140 to 400 and having aliphatically and/or cycloaliphatically bound isocyanate groups. Examples include 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethyl-cyclohexane (isophorone diisocyanate, IPDI), 4,4'-diisocyanatodicyclohexylmethane and mixtures of these diisocyanates.

The starting components A) are preferably polyisocyanate mixtures which contain isocyanurate groups and optionally uretdione groups and have an isocyanate content of 19 to 24% by weight. These mixtures predominantly contain trimeric 1,6-diisocyanatohexane and optionally dimeric 1,6-diisocyanatohexane. The isocyanurate group-containing polyisocyanates having the above-mentioned isocyanate content which are substantially free from uretdione groups are particularly preferred as component A). These polyisocyanates may be obtained in known manner by the catalytic trimerization of 1,6-diisocyanatohexane with isocyanurate formation and preferably have an (average) isocyanate functionality of 3.2 to 4.2.

Component B) is selected from monovalent polyalkylene oxide polyether alcohols containing, on statistical average, 5.0 to 9.9, preferably 6.0 to 8.0 ethylene oxide units per molecule. The polyether alcohols may be obtained in known manner by the alkoxylation of suitable starter molecules. Any monohydric alcohols having a molecular weight of 32 to 150, for example those used according to EPA-206,059, may be used as starter molecules for the preparation of the polyether alcohols B) used in the process according to the invention. Methanol is a particularly preferred starter molecule.

Ethylene oxide and propylene oxide are suitable alkylene oxides for the alkoxylation reaction. They may be added sequentially and/or as mixtures in the alkoxylation reaction.

The polyalkylene oxide polyether alcohols B) may be either pure polyethylene oxide polyethers or mixed polyalkylene oxide polyethers in which at least 70 mole %, preferably at least 80 mole % of the alkylene oxide units are ethylene oxide units.

Pure polyethylene glycol monomethylether alcohols containing, on statistical average, 5.0 to 9.9, preferably 6.0 to 8.0 ethylene oxide units are particularly preferred starting components B) for the process according to the invention.

To carry out the process according to the invention, the starting components are reacted together at temperatures of 20° to 120° C., preferably 40° to 100° C., in proportions corresponding to an NCO/OH equivalent ratio of 4:1 to 120:1, preferably 6:1 to 100:1. The reaction is preferably continued until the theoretically calculated isocyanate content has been reached. The nature and quantitative ratios of the starting components are also chosen, within the context of the conditions indicated above, so that the resulting polyisocyanate mixtures a) have an average isocyanate functionality of 1.8 to 4.2, preferably 2.0 to 4.0,
b) have an isocyanate content of 12.0 to 21.5% by weight, preferably 15.0 to 20.5% by weight and
c) contain 2 to 20% by weight, preferably 3 to 17% by weight, of ethylene oxide units arranged within polyether chains.

The reaction may be carried out in a suitable isocyanate inert solvent, although this is less preferred. Suitable solvents are known and include ethyl acetate, butyl acetate, ethylene glycol monomethyl- or -ethyl ether acetate, 1-methoxypropyl-2-acetate, 2-butanone, 4-methyl-2-pentanone, cyclohexanone, toluene or mixtures thereof; or solvents such as propylene glycol diacetate, diethylene glycol dimethylether, diethylene glycol ethyl and butyl ether acetate, N-methylpyrrolidone, N-methylcaprolactam and mixtures of these solvents.

The products obtained by the process according to the invention are clear, virtually colorless polyisocyanate mixtures having the composition indicated above. They have no tendency to crystallize even during prolonged storage and at low temperatures. The viscosities are generally only insignificantly higher than those of the polyisocyanates used as starting component A).

The polyisocyanate mixtures according to the invention can easily be emulsified in water without the aid of high shearing forces, simply by stirring. For a given total proportion of ethylene oxide units, a much lower viscosity maximum needs to be overcome than in the case of the known hydrophilically modified polyisocyanates of the state of the art, so that high speed stirrers or co-solvents having an emulsifying action need not be used for the preparation of emulsions from the products of the process according to the invention.

The polyisocyanate mixtures according to the invention enable stable emulsions to be prepared in which a reaction of the isocyanate groups with water takes place slowly. Example 1 demonstrates that the isocyanate content decreases by less than 10 rel.-% during the first 5 hours after emulsification. The emulsions contain no precipitates or ground sediment even after they have been left to stand for more than 24 hours.

Additional (cyclo)aliphatic polyisocyanates which have not been rendered hydrophilic, in particular polyisocyanates containing the groups previously set forth, may be added before emulsification to the polyisocyanate mixtures prepared by the process according to the invention. The quantitative ratios are chosen such that the resulting polyisocyanate mixtures satisfy the conditions mentioned under a) to c) above. Therefore, the polyisocyanate mixtures formed in this manner also constitute polyisocyanate mixtures according to the invention since they are generally mixtures of (i) polyisocyanates which have been hydrophilically modified according to the invention and
(ii) polyisocyanates which have not been hydrophilically modified of the type exemplified.

In these mixtures the products of the process according to the invention assume the function of an emulsifier for the non-hydrophilically modified polyisocyanates.

The polyisocyanate mixtures according to the invention are valuable starting materials for the production of polyurethane resins by the isocyanate polyaddition process. Aqueous emulsions of the polyisocyanate mixtures are preferably used for this purpose. They may be reacted as aqueous two-component systems in combination with polyhydroxyl compounds which are dispersed in water.

The polyisocyanate mixtures according to the invention are particularly preferred as cross-linking agents for aqueous solutions or dispersions of binders or binder components containing isocyanate reactive groups, in particular alcoholic hydroxyl groups, for the production of coating compositions containing such binders or binder components. Combining the crosslinking agents, optionally in emulsified form, with the binders or binder components may be carried out by simple stirring before the coating compositions are worked up by any desired methods, including the use of two-component spray guns.

Examples of suitable aqueous resins which may be used as binders or binder components include polyurethanes dispersed in water, which can be cross-linked with polyisocyanates through active hydrogen atoms present in the urethane groups; hydroxyl group-containing polyacrylates dissolved or dispersed in water, in particular those having a molecular weight ($M_n$) of 1000 to 10,000, which form valuable two-component binders when combined with the organic polyisocyanates; and aqueous dispersions of optionally urethane modified polyester resins containing hydroxyl groups, of the type known from polyesters and alkyd resin chemistry. Any aqueous solutions or dispersions of binders containing isocyanate reactive groups are suitable in principle. When used for this purpose, the polyisocyanate mixtures according to the invention are generally used in quantities corresponding to an equivalent ratio of isocyanate groups to isocyanate reactive groups, in particular alcoholic hydroxyl groups, of 0.5:1 to 2:1.

The polyisocyanate mixtures according to the invention may also be added in minor quantities to nonfunctional aqueous lacquer binders for improving certain properties, for example, as additives for improving adhesion.

The aqueous coating compositions formulated with the polyisocyanate mixtures according to the invention may be applied to any substrates, e.g., metal, wood, glass, stone, ceramic materials, concrete, rigid and flexible synthetic resins, textiles, leather and paper. These substrates may first be treated with conventional primers before they are coated.

The aqueous coating compositions may also contain the auxiliary agents and additives conventionally used in the coatings industry, such as levelling agents, pigments, fillers and matting agents. Coatings prepared from these compositions generally have good technical properties even when dried at room temperature. The coatings may also be dried under forced air conditions at elevated temperatures or by stoving at temperatures of up to 260° C.

Due to their excellent emulsifiability in water, which enables them to be homogeneously and very finely distributed in aqueous binders, the polyisocyanate mixtures according to the invention are distinctly superior to the known water emulsifiable polyisocyanates with regard to their suitability as cross-linking components for aqueous polyurethane reactive systems. In addition, their use results in coatings which in particular have greatly improved optical properties, i.e., better surface gloss, levelling and increased transparency.

The following examples serve to further illustrate the invention. All percentages are percentages by weight unless otherwise indicated.

EXAMPLES

Example 1

0.08 equivalents of a monofunctional polyethylene oxide polyether which was started on methanol and had an average molecular weight of 350 were added at room temperature with stirring to 1.0 equivalent of a polyisocyanate containing isocyanurate groups, prepared from 1,6-diisocyanatohexane (HDI) and having an isocyanate content of 21.5%, an average isocyanate functionality of about 3.8 and a viscosity of 3000 mPa.s (23° C.). The mixture was then heated to 100° C. for 3 hours. After it had cooled to room temperature, a virtually colorless, clear polyisocyanate mixture according to the invention was obtained. The isocyanate content was 17.3%, the ethylene oxide unit content was 11.3% and the viscosity was 3050 mPas (23° C.).

175 g of deionized water were added to 75 g of this polyisocyanate mixture in an Erlenmeyer flask and the mixture was converted into a finely divided, blue tinted emulsion by mild stirring.

The isocyanate content of the emulsion decreased by less than 10 rel.-% during the first 5 hours at 23° C., as may be seen from the following Table.

| Residence time of the emulsion [min] at 23° C. | Isocyanate content (%) |
|---|---|
| 5 | 5.2 |
| 60 | 5.0 |
| 120 | 4.9 |
| 180 | 4.9 |
| 240 | 4.7 |
| 300 | 4.7 |

The emulsion was still stable after a residence time of 24 h (23° C.) and showed no signs of precipitation or ground sediment.

Example 2

2.5 equivalents of a polyisocyanate mixture containing uretdione and isocyanurate groups, prepared from HDI and having an isocyanate content of 21.9%, an average isocyanate functionality of about 2.4 and a viscosity of 150 mPa.s (23° C.) were mixed at room temperature with 0.13 equivalents of the polyether described in Example 1. The mixture was stirred at 100° C. for 2.5 hours. After cooling a clear, colorless polyisocyanate mixture according to the invention was obtained which had an isocyanate content of 18.9%, an ethylene oxide unit content of 7.9% and a viscosity of 320 mPas (23° C.).

Example 3

1.0 equivalent of a polyisocyanate containing isocyanurate groups, prepared from HDI and having an isocyanate content of 22.5%, an average isocyanate functionality of about 3.3 and a viscosity of 800 mPa.s (23° C.) was mixed at room temperature with 0.03 equivalents of the polyether described in Example 1. The mixture was stirred at 100° C. for 2 hours. After cooling a clear, virtually colorless polyisocyanate mixture according to the invention was obtained which had an isocyanate content of 20.7%, an ethylene oxide unit content of 4.8% and a viscosity of 1100 mPa.s (23° C.).

Example 4 (Comparison Example)

0.035 equivalents of a monofunctional polyethylene oxide polyether which was started on methanol and had an average molecular weight of 750 were added at room temperature to 1.0 equivalent of the isocyanurate group-containing polyisocyanate described in Example 1. The reaction mixture was then heated to 100° C. for 4 hours until an isocyanate content of 18.3% was obtained. The product, which had an ethylene oxide content of 11.3%, partially crystallized when cooled to room temperature and, therefore, was unsuitable for use in coating compositions.

Example 5 (Comparison Example)

0.015 equivalents of a monofunctional polyethylene oxide/polypropylene oxide polyether which was started on n-butanol and had an ethylene oxide unit content of 80% and an average molecular weight of 2150 was added at room temperature to 1.0 equivalent of the isocyanurate group-containing polyisocyanate described in Example 1 and the mixture was then heated to 100° C. for one hour. When it had cooled to room temperature a pale yellow, clear polyisocyanate mixture was obtained having an isocyanate content of 18.2%, an ethylene oxide unit content of 11.3% and a viscosity of 3,360 mPa.s (23° C.).

Example 6 (Use)

100 parts by weight of an aqueous hydroxy-functional polyacrylate dispersion having a solids content of 30% and an OH content of 4.0%, based on solids, and substantially containing a copolymer of 8.3% acrylic acid, 18.1% methyl methacrylate, 41.7% n-butyl acrylate and 31.9% hydroxy-$C_3$-alkylacrylate (product of addition of propylene oxide to acrylic acid) were mixed with 0.6 parts by weight of a 25% aqueous solution of a commercial emulsifier (emulsifier WN, Bayer AG, Leverkusen), 2.25 parts by weight of a 20% aqueous solution of a commercial non-ionic polyurethane thickener (Acrysol RM8, Rohm and Haas, Frankfurt) and 0.7 parts by weight of a commercial defoamant (Bevaloid 581B, Erbslöh, Düsseldorf. The composition was indefinitely stable in storage.

An isocyanate functional cross-linking component was added to the above-mentioned reaction mixture and the mixture was homogenized by intensive stirring.

When the polyisocyanate mixture according to the invention from Example 1 was used as cross-linking component (25.8 parts by weight, corresponding to an equivalent ratio of isocyanate groups to alcoholic hydroxyl groups of 1.5:1), rapid homogenization was achieved simply by stirring. The time available for processing after all of the components had been mixed was 2 to 3 hours. A film applied in a wet film thickness of 200 μm (corresponding to a dry film thickness of about 50 μm) appeared almost transparent immediately after its application as a wet film. It had a slightly yellowish shimmer (Tyndall-Effect). The film was surface dry in about 2 to 3 hours and was completely dry in about 3 to 4 hours. A glossy, completely clear and transparent film was obtained.

The cured tough elastic film had a pendulum hardness (Albert/Konig) of 80 seconds and had good resistance to the action of mineral spirits, solvent naphtha and methoxypropyl acetate and moderate resistance to the action of acetone and ethanol.

A polyisocyanate mixture according to the invention was prepared by mixing 14.1 parts by weight of the polyisocyanate mixture from Example 1 and 9.4 parts by weight of the uretdione- and isocyanurate group-containing polyisocyanate starting material from Example 2. When all of this mixture was added to 100 parts of the previously described mixture of polyacrylate dispersion and additives (corresponding to an equivalent ratio of isocyanate groups to alcoholic hydroxyl groups of 1.5:1), rapid homogenization was again achieved simply by stirring.

The mixture of components had a processing time of 3 to 4 hours. A film applied in a wet film thickness of 200 μm (corresponding to a dry film thickness of about 50 μm) appeared cloudy after its application as a wet film. The time required for surface drying was one hour and for complete drying was 3 to 4 hours. A glossy, completely clear and transparent coating having the following properties was obtained.

| | |
|---|---|
| Optical properties (Gloss/Transparency) | very good |
| Pendulum hardness (Albert/Konig) | 90 sec |
| Solvent resistance | |
| Mineral spirits | very good |
| Solvent naphtha 100 | very good |
| Methoxypropyl acetate | very good |
| Acetone | good |
| Ethanol | good |

When the comparison polyisocyanate mixture from Example 5 (24.5 parts by weight, corresponding to an equivalent ratio of isocyanate groups to alcoholic hydroxyl groups of 1.5:1), was added to 100 parts by weight of the previously described mixture of polyacrylate dispersion and additives, homogenization of the coating composition was difficult to achieve simply by stirring. Films applied in a wet film thickness of 200 μm (corresponding to a dry film thickness of about 50 μm) had a milky white appearance immediately after their application. After drying and curing, they remained cloudy and had a matt surface.

Example 7 (Use)

100 parts by weight of an aqueous hydroxy-functional polyacrylate dispersion having a solids content of 48.2% and an OH content of 2.0%, based on solids, and substantially containing a copolymer of 17.1% 4-hydroxybutyl acrylate, 40.0% n-butyl acrylate, 41.5% methyl methacrylate and 1.4% acrylic acid were mixed with 4.82 parts by weight of a 1.0% aqueous solution of a commercial non-ionic polyurethane thickener (Acrysol RM8, Rohm and Haas, Frankfurt), 0.96 parts by weight of a 25% aqueous solution of a commercial emulsifier (emulsifier WN, Bayer AG, Leverkusen) and 0.57 parts by weight of a commercial defoamant (Bevaloid 581B, Erbslöh Company, Düsseldorf).

This preparation was stable in storage. A cross-linking component was added to the above-mentioned reaction mixture and the mixture was homogenized by intensive stirring.

When the polyisocyanate mixture according to the invention from Example 1 was used (13.8 or 27.6 parts by weight corresponding to an NCO/OH equivalent ratio of 1:1 or 2:1), rapid homogenization was achieved simply by stirring. The processing time available after components had been mixed was 5 to 8 hours. A film applied in a wet film thickness of 200 μm (corresponding to a dry film thickness of about 50 μm) appeared almost transparent in the wet state immediately after its application. It has a slightly yellowish shimmer (Tyndall effect). The film was surface dry in 1 to 2 hours and was completely dry in about 2 to 3 hours. Glossy, completely clear and transparent films were obtained. The cured, tough, hard films had the following properties:

| | NCO/OH 1.0 | NCO/OH 2.0 |
|---|---|---|
| Optical properties of film | very good | very good |
| Pendulum hardness | 70 sec | 85 sec |
| Solvent resistance | | |
| Mineral spirits | very good | very good |
| Solvent naphtha | good | very good |
| Methoxypropyl acetate | good to moderate | good |
| Acetone | moderate | moderate |
| Ethanol | good to moderate | good to moderate. |

When the comparison polyisocyanate mixture from Example 5 (13.1 or 26.2 parts by weight, corresponding to an NCO/OH equivalent ratio of 1:1 to 2:1), was added to 100 parts by weight of the previously described mixture of polyacrylate dispersion and additives, homogenization of the coating composition was difficult. Films applied in the wet film thickness of 200 μm (corresponding to a dry film thickness of about 50 μm) had a milky white appearance immediately after application. After drying and curing, they remained cloudy and had matt surfaces.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-dispersible polyisocyanate mixture which
   a) has an average isocyanate functionality of 1.8 to 4.2,
   b) contains 12.0 to 21.5% by weight of (cyclo)aliphatically bound isocyanate groups (calculated as NCO, molecular weight=42),
   c) contains 2 to 20% by weight of ethylene oxide units (calculated as $C_2H_4O$, molecular weight=44) arranged within polyether chains, the polyether chains containing, on average, 5.0 to 9.9 ethylene oxide units and
   d) is not prepared from and does not contain 1,6-hexamethylene diisocyanate.

2. A process for the preparation of a polyisocyanate mixture which
   a) has an average isocyanate functionality of 1.8 to 4.2,
   b) contains 12.0 to 21.5% by weight of (cyclo)aliphatically bound isocyanate groups (calculated as NCO, molecular weight=42),
   c) contains 2 to 20% by weight of ethylene oxide units (calculated as $C_2H_4O$, molecular weight=44) arranged within polyether chains, the polyether chains containing an average of 5.0 to 9.9 ethylene oxide units and
   d) is not prepared from or does not contain 1,6-hexamethylene diisocyanate,
   which comprises reacting at an NCO/OH equivalent ratio of 4:1 to 120:1
   A) a polyisocyanate component having an average isocyanate functionality of 2.1 to 4.4 and containing one or more polyisocyanates other than 1,6-hexamethylene diisocyanate in which all of the isocyanate groups are (cyclo)aliphatically bound with
   B) a monovalent polyalkylene oxide polyether alcohol containing an average of 5.0 to 9.9 ethylene oxide units.

3. The process of claim 2 wherein said polyether alcohol contains, on average, 6.0 to 8.0 ethylene oxide units.

4. A composition which comprises
   I) a water-dispersible polyisocyanate mixture which
      a) has an average isocyanate functionality of 1.8 to 4.27,
      b) contains 12.0 to 21.5% by weight of (cyclo)aliphatically bound isocyanate groups (calculated as NCO, molecular weight=42),
      c) contains 2 to 20% by weight of ethylene oxide units (calculated as $C_2H_4O$, molecular weight=44) arranged within polyether chains, the polyether chains containing, on average, 5.0 to 9.9 ethylene oxide units and
      d) is not prepared from or does not contain 1,6-hexamethylene diisocyanate and
   II) a water soluble or water-dispersible aqueous resin containing isocyanate reactive groups.

5. The composition of claim 4 wherein said isocyanate reactive groups comprise alcoholic hydroxyl groups.

* * * * *